United States Patent [19]

Bandel et al.

[11] Patent Number: 4,933,084

[45] Date of Patent: Jun. 12, 1990

[54] DIALYSIS MEMBRANE OF CELLULOSE IN THE SHAPE OF A HOLLOW FIBER, AND PROCESS FOR THE PRODUCTION THEREOF

[75] Inventors: Werner Bandel; Werner Henne; Gustav Dünweg, all of Wuppertal, Fed. Rep. of Germany

[73] Assignee: Akzo NV, Arnhem, Netherlands

[21] Appl. No.: 690,977

[22] Filed: Jan. 11, 1985

Related U.S. Application Data

[63] Continuation-in-part of Ser. No. 306, 702, Sept. 29, 1981, abandoned, which is a continuation-in Part of Ser. Nos. 80, 786 and 80,787 jointly, filed Oct. 1, 1979 both now abandoned.

[30] Foreign Application Priority Data

| Oct. 2, 1978 | [DE] | Fed. Rep. of Germany | 2842836 |
| Oct. 2, 1978 | [DE] | Fed. Rep. of Germany | 2842957 |
| Oct. 2, 1978 | [DE] | Fed. Rep. of Germany | 2842958 |
| Nov. 9, 1978 | [DE] | Fed. Rep. of Germany | 2848601 |
| Feb. 21, 1979 | [DE] | Fed. Rep. of Germany | 2906576 |

[51] Int. Cl.$^5$ ............................................. B01D 13/01
[52] U.S. Cl. ........................... 210/500.23; 210/321.73; 210/500.29; 428/374; 428/398; 428/399
[58] Field of Search .............. 210/321, 500, 502, 506, 210/321.73, 500.23, 500.29, 500.3, 500.31, 500.32; 264/177 F; 422/48; 55/16, 158; 428/369, 370, 371, 374, 376, 378, 392, 393, 397, 398, 399, 400; 306/702

[56] References Cited

U.S. PATENT DOCUMENTS

| 3,700,545 | 10/1972 | Matsui et al. | 161/175 |
| 3,704,223 | 11/1972 | Dietzsch et al. | 210/321.3 |
| 3,737,043 | 6/1973 | Clark | 210/321.1 |
| 3,742,946 | 7/1973 | Grossman | 128/214 R |
| 3,772,137 | 11/1973 | Tolliver | 264/177 F |
| 3,888,771 | 6/1975 | Isuge et al. | 210/500.2 |
| 4,164,437 | 8/1979 | Henne et al. | 156/167 |
| 4,175,153 | 11/1979 | Dobo et al. | 428/398 |
| 4,176,069 | 11/1979 | Metz et al. | 422/48 |
| 4,222,869 | 9/1980 | Kato | 210/646 |

FOREIGN PATENT DOCUMENTS

48-75481 10/1973 Japan ................................... 210/508

OTHER PUBLICATIONS

Cuprophan Technical Information Bulletin, No. 12, 9/1976, Enka Glanzstoff AG, Wuppertal Barmen, P.O. Box 200916, W. Germany.

Primary Examiner—Richard V. Fisher
Attorney, Agent, or Firm—Michael J. Striker

[57] ABSTRACT

Dialysis membranes are disclosed, in the shape of hollow fibers composed of cellulose regenerated from copper-ammonia solution, having a continuous hollow cavity and a closed wall, wherein in any cross-section normal to the direction of the fiber axis the difference of the distance to the outer wall surface and the distance to the inner wall surface, each measured from the fiber midpoint, varies along the periphery, the fiber midpoint being the midpoint of the circle circumscribing the fiber cross-section, and the cross-section normal to the direction of the fiber axis possessing the shape of a circle, a deformed circle, an ellipse, a kidney-shaped deformed ellipse, or a deformed quadrangle. In one particular embodiment, the wall thickness of the hollow fiber along its periphery at least once continuously increases to a maximum thickness and decreases to a minimum thickness, the respective maximum and minimum thicknesses being spaced approximately equally about the periphery, with all portions of maximum thickness having the same maximum thickness and all portions of minimum thickness having the same minimum thickness.

8 Claims, 2 Drawing Sheets

DIALYSIS MEMBRANE OF CELLULOSE IN THE SHAPE OF A HOLLOW FIBER, AND PROCESS FOR THE PRODUCTION THEREOF

CROSS-REFERENCE TO RELATED APPLICATIONS

This application is a continuation-in-part of application Ser. No. 306,702, filed Sept. 29, 1981, since abandoned; which is in turn, a continuation-in-part of application Ser. Nos. 80,796 and 80,787, jointly filed Oct. 1, 1979, since abandoned.

A claim of priority under 35 U.S.C. 119 is asserted on the bases of Ser. Nos. 80,786 and 80,787 which contain the necessary priority papers.

BACKGROUND OF THE INVENTION

The invention concerns a dialysis membrane of cellulose regenerated from a cuoxam solution, i.e., a cupric ammonium solution, in the form of a hollow fiber with a continuous hollow interior and a closed mantel line (i.e., periphery).

Hollow fibers exhibiting a continuous hollow interior and regenerated cellulose from cuoxam solutions are known, for example, from German Pat. No. DE-PS 736 321.

U.S. Pat. No. 3,228,877 discloses that fibers prepared according to DE-PS 736 321 are suitable as dialysis membranes and also for reverse osmosis.

Hollow fibers from cellulose regenerated from cuoxam solutions, exhibiting a defined membrane structure, a uniform wall thickness along the total fiber axis and a true circular cross-section are known from U.S. Pat. No. 3,888,771. In addition, these fibers are stretched and exhibit good tensile strength properties. Although an improved strength resulting from stretching is desirable, this deleteriously affects the swelling properties of the membrane, thereby reducing the effectiveness of the dialysis.

U.S. Pat. No. 3,700,545 describes multi-segment fibers, whereby in the reference FIGURES no hollow fibers are represented, but rather bi-component multi-segment fibers with "side-by-side", "eccentric core-mantel" and "centric core-mantel" arrangement.

U.S. Pat. No. 4,175,153 describes inorganic, monolithic hollow fibers. It is in connection with the extrusion of a polymer solution which contains inorganic material, indeed referring thereto, that also profiled spinning nozzles can be employed. However, circular-shaped spinning nozzles are expressly preferred.

During dialysis, for example, hemodialysis, it is necessary that the membrane wall can be contacted or surrounded completely and without hindrance by the dialysis fluid. When packed into bundles as dialysis membranes, the hollow fibers with true circular cross-sections, tend to associate closely together along their entire length, much the same as the so-called glass plate effect between two flat parallel plates. This phenomenon increase more seriously in bundles of such fibers which, for their intended use, may have fiber densities of between about 500 and 1000 per cm$^2$.

Introduction of the dialysis fluid into the intermediate areas between the hollow fibers becomes more difficult on account of this fiber association, the surfaces at which the hollow fibers associate closely together remaining unused for the exchange process. As a result, the effectiveness of the hollow fiber module is reduced.

In hemodialysis, the effectiveness of a dialysis membrane depends on the ratio of the exchange surface to the volume and the concentration gradients at the sides of the membrane walls. Stream flow conditions in the membrane interior are also significant. During laminar stream flow, an outer layer forms along the membrane walls; this layer has a reduced concentration of metabolites. The resulting effect is a reduction in the exchange rate at a given concentration gradient. Until now, only hollow fibers with circular cross-section have been used. Those deviating from truly circular have been considered as deleterious.

SUMMARY OF THE INVENTION

It is an object of the present invention to provide a membrane of cellulose regenerated from cuoxam solution in the form of a hollow fiber with a continuous hollow interior and closed mantel line, in which the effectiveness of the dialysis can be improved through a better type of exchange surface.

A further object of the invention is to provide dialysis hollow fibers from regenerated cellulose which exhibit only very slight tendency to adhere to adjacent hollow fibers, and in which the tendency to form laminar stream flow profiles is diminished.

These objects are achieved according to the present invention by means of dialysis membrane in the form of a hollow fiber possessing continuous hollow interior and closed walls, and in which in any optional cross-section normal to the fiber axis the difference of the distance from the outer wall surface and of the distance of the inner wall surface, each distance measured from the fiber midpoint, varies over the extent of the fiber, the fiber midpoint being the midpoint of the smallest circle surrounding the fiber cross-section, and the fiber cross-section normal to the fiber axis possesses the shape of a circle, a deformed circle, an ellipse, a kidney-shaped deformed ellipse, or a deformed quadrangle. By midpoint of the fiber is thus understood the midpoint of the smallest circle surrounding the fiber cross-section. If the mantel line forms a circle, for example, the midpoint of the circle is also the midpoint of the fiber. With fiber cross-sections that are irregular, the fiber midpoint is formed by the midpoint of the circle which embraces the total fiber cross-section.

According to an embodiment of the invention, the wall thickness in a cross-section normal to the direction of the fiber axis is the same as in adjacent portions along the periphery, or the thickness is variable. For the case that the thickness is variable, the ratio of maximum thickness to minimum thickness has a statistically averaged value from 2 up to 6. According to another embodiment, with which the wall thickness in a cross-section normal to the direction of the fiber axis differs from the thickness of adjacent portions along the periphery, a ratio of maximum thickness to minimum thickness is greater than 1.5 and less than 2.

When the cross-section normal to the direction of the fiber axis forms an ellipse, the exchange surface is considerably increased for the same blood volume, so that on this basis the effectiveness of the metabolite exchange is substantially improved by means of the dialysis membranes according to the present invention. In addition, there is a further improvement in the effectiveness of dialysis on account of the reduced blood film thickness in the dialysis membranes according to the preset invention. The effect of the fibers adhering to one another known for circular dialysis fibers, is surprisingly not observed, albeit such effect must have been expected to an even greater degree than with the circular fibers. Obviously, the fibers orient themselves in a random manner and thus prevent a lamination.

A reniform or kidney-shaped deformed ellipse has proven to be particularly advantageous, since the hollow fibers exhibit an exceptional stability in form with increased exchange surface.

The dialysis membranes according to the present invention must in no way display a symmetric form.

A deformed quadrangle is such a quadrangle in which at most, each pair of opposite angles are approx. equal and in which the sides are essentially curved or buckled.

The surface of the hollow interior cross-section should preferably lie between about $0.6 \times 10^{-3}$ and 0.8 mm$^2$. With still higher hollow interior cross-section surfaces of hollow fibers which are used for dialysis and which have cross-sections deviating from a circle, there exists the danger of collapse of the hollow fibers and therewith the throughput of blood is interrupted. The wall thickness of hollow fibers of circular cross-section used for dialysis should lie in known manner between 1 and 100 $\mu$m and preferably between 5 and 50 $\mu$m.

In order to obtain a good stability of form of the cross-sectional shapes of dialysis membranes according to the present invention, the wall thickness of a cross-section normal to the direction of the fiber axis at adjacent sections along the periphery, displays a different thickness.

Another embodiment of the invention is one in which the fiber cross-section normal to the fiber axis is so formed that the wall of the hollow fiber along its periphery at least once continuously increases up to a maximum thickness and decreases to a minimum thickness.

It is surprising to find that compared to those of prior art having unchanged exchange surface and cellulose amount in the hollow fiber cross-section, the fibers according to the present invention provide a clearly increased clearance of material exchange metabolites, only by means of the inventive distribution of the cellulose mass over the cross-section. The thick portions of the hollow fiber membranes provide a stabilizing framework for the thin membrane portions, without destroying their permeability.

The fiber lumen can be formed with a wide variety of cross-sections, for example circular, elliptical, triangular, quadrangular, or also polygonal, whereby on manufacturing grounds the angles are more or less rounded off. In embodiments of the invention displaying multiple increases and decreases in wall thickness, the respective regions of maximum and minimum thickness are at approximately the same intervals along the periphery. Highly stabilized hollow fibers are particularly obtained with quadrangular and polygonal hollow cavity shapes. The resulting cross-section forms can be not only symmetrical but also asymmetrical.

In order to obtain a good stabilization it is particularly advantageous that all regions of maximum thickness have the same maximum thickness, while all regions of minimum thickness have the same minimum thickness.

For hemodialysis, particularly such hollow fibers with circular cross-sections are employed. Even such hollow fibers with circular wall boundary and circular lumen boundary can advantageously be so constructed according to the present invention for dialysis that the wall thickness of the fibers increases and decreases although the fiber periphery and the lument periphery are both essentially circular, the midpoints of both these circles, however, being separate by a distance from each other. The distance of separation of the midpoints of both circles corresponds to about 20–80% of the difference between the radii of the two circles, and preferably between about 40–60% of this difference.

A known disadvantage of, particularly, circular cross-section dialysis hollow fibers is that the wall thickness can only then be reduced when also the diameter of the hollow fiber is correspondingly decreased. When the ratio of hollow interior diameter to wall thickness is greater than 10, and in particular when it exceeds the ratio of about 25, the hollow fiber is unstable and can easily collapse and lead to a disturbance of the blood flow during hemodialysis. According to the present invention, the ratio of hollow interior diameter to minimum thickness of the walls lies between about 25 and 80, preferably between 40 and 60. The minimum thickness of the invented hollow fibers is preferably 3 to 9 $\mu$m.

The formation of the hollow fiber shapes of the invention is effected through use of a hollow fiber nozzle with a correspondingly arranged spinning slit and a central bore for the introduction of liquid for forming the hollow interior. Thus, for example, fibers according to the present invention as illustrated in FIG. 1 may be prepared with a spinning nozzle having an eccentric spinning slit and an eccentrically oriented bore for the introduction of the hollow interior-forming fluid. For other shaped cross-sections, one can prepare spinning nozzles which are provided with suitable spinning slits and central bores; the arrangement of such nozzles should be clear without further description, based upon the desired cross-section. To achieve, for example, an elliptical form, an ellipse in the spinning nozzle is chosen with a larger axis ratio between the major and minor axes than that of the ellipse to be formed in the cross-section of the hollow fiber.

For other cross-sectional shapes, hollow fiber spinning nozzles are used having spinning slits corresponding to the desired shapes; for example an oblique quadrangle. The breadth of the spinning slit is selected as desired e.g. so that the wall thickness in neighboring sections along the periphery of the cross-section normal to the direction of the fiber axis displays a different thickness, broader in some places and narrower in others.

It is also possible to form a double or multiple layered wall in hollow fibers for use in the invented dialysis membranes, as disclosed in German Patent applications P 26 27 858, P 27 05 735 and P 27 05 773. Such a construction enables an increase in leakproofness. Alternatively, a surface of chemically-modified cellulose may be incorporated, or adsorbents may be provided in the membrane walls.

The novel features which are considered characteristic of the invention are set forth in particular in the appended claims. The invention itself, however, both as to its construction and its method of operation, together with additional objects and advantages thereof, will be best understood from the following description of specific embodiments when read in conjunction with the accompanying drawings. The actual shape relations have intentionally been exaggerated in the drawings in order to show more clearly the cross-sections according to the invention.

BRIEF DESCRIPTION OF THE DRAWINGS

According to the present invention, a plurality of cross-sectional shapes of the dialysis membrane hollow fibers according to the present invention can be prepared. Figures 1–6 represent only several cross-sectional shapes. For example, also corresponding cross-sections in which the hollow cavities are formed pentagon or polygon shaped are so stabilized by means of portions of maximum wall thickness, that a greater part of the exchange surface can be arranged with clearly smaller wall thickness, and that upon hemodialysis, the effectiveness is improved. As is shown in FIG. 3, the points of maximum wall thickness can also be extended to a portion of constant maximum wall thickness. The portions of constant wall thickness should herewith amount to less than half of the periphery, in the greatest case.

DESCRIPTION OF THE PREFERRED EMBODIMENTS

EXAMPLE 1

Production of a Dialysis Membrane according to the present Invention with Eccentric Cross-section.

Figure 1:
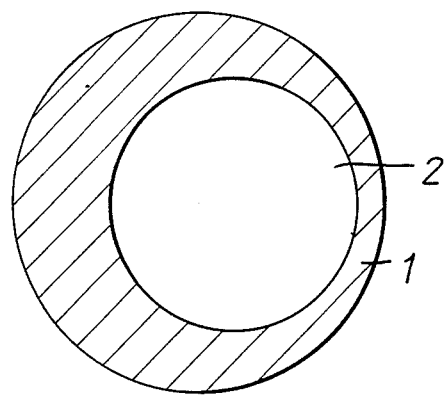
FIG. 1 shows a hollow fiber with circular hollow cavity and also circular cross-section. The midpoints of both these circles are eccentric to one another whereby it follows that, clearly visible, a portion of maximum wall thickness proceeds continuously into a section of minimum wall thickness. 1' is the membrane wall of hollow fiber 2', the wall being composed of cellulose regenerated from copper-ammonia solution.
Figure 2:
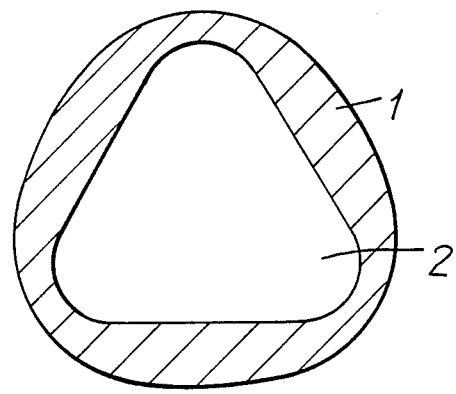
FIG. 2 shows a hollow fiber having a triangular hollow cavity, whereby the angles are rounded off. Maximum thicknesses and minimum thicknesses are disposed at approximately the same distances from one another, whereby all three sections with maximum thickness and all three sections with minimum thickness, respectively possess the same thickness. Also in this case, 1' is the membrane wall, composed of cellulose regenerated from copper-ammonia solution, of hollow fiber 2'.
Figure 3:
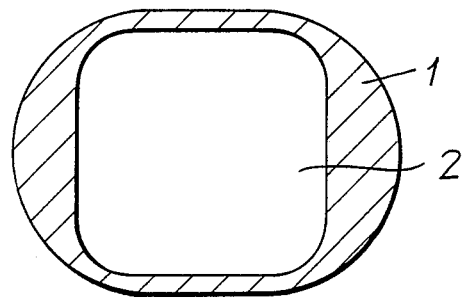
FIG. 3 shows the cross-section of a hollow fiber dialysis membrane according to the present invention, which has a quadrangular hollow cavity, in which the wall thickness of the hollow fiber along the periphery twice increases continuously up to a maximum thickness and twice decreases to a minimum thickness. This maximum thickness is obtained at the point at which the continuous increase converts to a continuous decrease. With this membrane the minimum thickness is not limited only to one point, but it remains constant in a portion of minimum wall thickness. Also in this case, 1' is the membrane wall, composed of cellulose regenerated from copper-ammonia solution, of the hollow fiber 2'.
Figure 4:
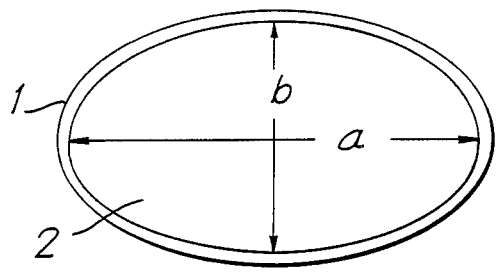
FIG. 4 shows a cross-section normal to the direction of the fiber axis of a dialysis membrane according to the present invention, whereby the shape is an ellipse. 1' is the membrane wall, composed of cellulose regenerated from copper-ammonia solution, of the hollow fiber 2'. The length of the long (major) axis of the ellipse is designated a, while the length of the short (minor) axis is designated b.
Figure 5:
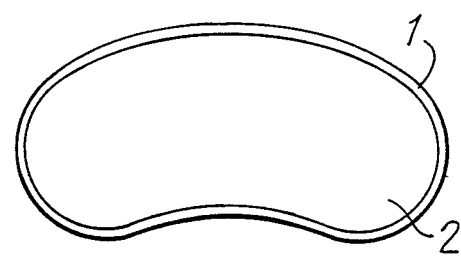
FIG. 5 shows a cross-section normal to the direction of the fiber axis of a dialysis membrane according to the present invention, whereby the shape is that of a kidney=shaped, deformed ellipse. 1' is the membrane wall, composed of cellulose regenerated from copper-ammonia solution, of hollow fiber 2'.
Figure 6:
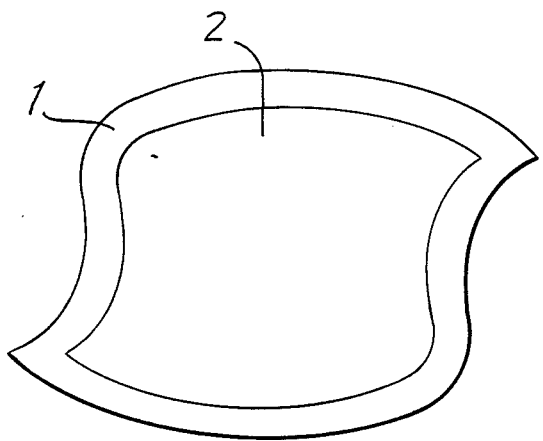
FIG. 6 shows a cross-section normal to the direction of the fiber axis of a dialysis membrane according to the present invention, whereby the shape is that of a deformed quadrangle. Adjacent sides of the quadrangle display a different thickness. Also in this case, 1' is the membrane wall, composed of cellulose regenerated from copper-ammonia solution, of hollow fiber 2'.

Hollow fibers are obtained with eccentric cross-section as is represented in FIG. 1. From a hollow fiber spinning nozzle with a cross-section as is represented in FIG. 1, a cellulose copper-ammonium solution having a cellulose concentration of 8.9% by weight is pressed. Isopropyl myristate is pressed out through the interior bore as a hollow cavity-forming fluid. The extruded spinning solution enters into a coagulation bath immediately after leaving the spinning nozzle. The bath contains 135 g/l sodium hydroxide, 6 g/l ammonia and 4 g/l copper. The temperature of the coagulation bath is 23° C. The hollow fiber-forming mass leaving the nozzle is led at an angle of 40° C. to the axis of the hollow fiber-spinning nozzle opening to the first take-off roller located in the coagulation bath, and beyond this roller turned and led over a second take-off roller. Therewith the exit speed of the hollow cavity-forming cellulose mass amounts to 30.9 m/min., the peripheral speed of the first roller being 30.9 m/min. and the peripheral speed of the second roller being 30.26 m/min.

After the conversion into the Normann cellulose complex, the copper is removed by leading the hollow fibers through the customary after-treatment baths. After a further caustic sod bath follows a water wash, a sulphuric acid wash and a further water wash. The reduction of the hollow fiber diameter to the desired dimension follows by means of stretching in the after-treatment baths.

The hollow fibers are subsequently dried in a cylinder dryer and rolled up, dry, on a cross-wound bobbin.

The minimum wall thickness of the obtained hollow fibers amounts to 6 μm, whereas the maximum wall thickness is 26 μm. The interior or lumen diameter of the hollow fibers is 215 μm.

EXAMPLE 2

Employment of The Dialysis Membrane according to the Present Invention with Eccentric Cross-section for Hemodialysis.

Hollow fiber bundles are prepared from hollow fibers with eccentric cross-section; these are constructed into a hollow fiber test dialyzator and tested under standard conditions.

The test method is described in Elias Klein et al, "Evaluation of Hemodialyzers and Dialysis Membranes", report of a study group for the artificial kidney-chronic uremia program 1977, United States Dept. of Health, Education and Welfare, Bethesda, Md. 20014, publication No. NIH 77-1294.

The dialysis membranes according to the present invention, prepared according to Example 1, are compared with commercially available hollow filaments customary for dialysis, of cellulose regenerated from copper-ammonium solution. The interior or lumen diameter of the commercially available dialysis hollow fibers amounts to 215 μm, whereas the wall thickness is 16 μm. The solution flow amounts to 200 ml/min.×m², and the dialyzate flow is 500 ml/min.×m². With the commercially available hollow fibers, the ultrafiltration speed amounts to 3.0 ml/h×m²×mm Hg, while the urea clearance is 140 ml/min. With the dialysis hollow fibers according to the present invention, the ultrafiltration speed is 4.0 ml/h×m²×mm Hg, while the urea clearance is 165 ml/min.

The fibers are shape-stable and displayed no tendency of flattening. The cross-sectional surfaces of the commercially available hollow fibers and the hollow fibers according to the present invention are the same.

EXAMPLE 3

Preparation of an Elliptical Dialysis Membrane according to the Present Invention.

A cellulose copper-ammonia solution having a cellulose concentration of 8.9% by weight is pressed through a hollow fiber spinning nozzle, the spinning slit of which is elliptically shaped so that the length of the long axis of the ellipse amounts to 2.7 × the length of the short axis and the interior bore of which is shaped into an ellipse with the same axis ratio. The breadth of the spinning slit of the employed hollow fiber nozzle is the same throughout. The length of the long axis of the ellipse amounts to ten times the breadth of the spinning slit. Isopropyl myristate is pressed through the interior bore as a hollow cavity-forming liquid.

The nozzle is so located that the exit openings occur 5 mm below the surface of a coagulation bath of 12.5% NaOH.

The hollow fiber-forming mass leaving the nozzle is introduced at an angle of 40° C. to the axis of the hollow fiber spinning nozzle openings to the first take-up roller located in the coagulation bath, and behind this roller it turns, being led over a second take-up roller. The exit speed of the hollow fiber-forming cellulose mass amounts to 30.9 m/min., while the peripheral speed of the first take-up roller is 30.9 m/min. and the peripheral speed of the second take-up roller is 30.26 m/min.

Thereafter the copper is removed by leading the hollow fiber through the customary after-treatment baths. After a further caustic soda bath, follows a water wash, a sulphuric acid wash and then a further water wash. The reduction of the hollow fiber diameter to the desired dimension follows by means of stretching in the after-treatment baths.

The hollow fibers are dried in a cylinder drier and then rolled onto a cross-wound bobbin.

Hollow fibers with elliptical cross-section are obtained. The long axis of the ellipse amounts to 290 μm and the short axis is 160 μm. The wall thickness, equal over the periphery, amounts to 17 μm.

The hollow fibers have a tensile strength of $24 \times 10^3$ c N/mm² and an elongation of 23%, measured at 23° C. and with 50% moisture. The double refraction amounts to 0.016.

It will be understood that each of the elements described above, or two or more together, may also find a useful application in other types of membranes differing from the types described above.

While the invention has been illustrated and described as embodied in dialysis membranes of cellulose in the shape of hollow fibers, and production thereof, it is not intended to be limited to the details shown, since various modifications and structural changes may be made with departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A dialysis membrane comprising cellulose regenerated from a copper-ammonia solution, and shaped as an elongated hollow fiber possessing a longitudinal fiber axis, a continuous hollow cavity and a closed wall with an outer wall surface which forms an outer side of the fiber and an inner wall surface which defines the limits of the continuous hollow cavity, the fiber being formed so that the difference of the distance to the outer wall surface and the distance to the inner wall surface, each measured from a fiber midpoint which is a midpoint of a smallest circle surrounding a fiber cross-section normal to the fiber axis, vary along a fiber periphery when viewed in the fiber cross-section normal to the fiber axis, whereby the fiber cross-section normal to the fiber axis possesses a shape of a circle, the fiber being formed so that a wall thickness of the hollow fiber along its periphery at least once continuously increases to a maximum wall thickness and decreases to a minimum wall thickness, a wall thickness measured between said outer wall surface and said inner wall surface of the hollow fiber so decreases that said outer wall surface and said inner wall surface form substantially two circles and midpoints of both these circles lie eccentric to each other.

2. The dialysis membrane according to claim 1, wherein a wall thickness measured between said outer wall surface and said inner wall surface in the fiber cross-section normal to the fiber axis possesses a differing thickness at adjacent portions along the fiber periphery and the ratio of maximum thickness to minimum thickness is greater than 1.5 and less than 2.

3. The dialysis membrane according to claim 1, wherein the hollow cavity has a cross-sectional area in the fiber cross-section normal to the fiber axis, which amounts to from $0.6 \times 10^{-3}$ to 0.8 mm².

4. The dialysis membrane according to claim 1, wherein a wall thickness measured between said outer wall surface and said inner wall surface of the hollow-fiber amounts to between 1 and 100 μm.

5. The dialysis membrane according to claim 1, wherein a wall thickness measured between said outer wall surface and said inner wall surface of the hollow fiber amounts to between 5 and 50 μm.

6. The dialysis membrane according to claim 1, wherein a distance measured between the midpoints of both said circles corresponds to from 20 to 80% of a difference in radii of both said circles.

7. The dialysis membrane according to claim 1, wherein the ratio of a hollow cavity diameter to the minimum wall thickness amounts to between 25 and 80.

8. The dialysis membrane according to claim 1, wherein a wall thickness measured between said outer wall surface and said inner wall surface in the fiber cross-section normal to the fiber axis possesses a varying thickness at adjacent portions along the fiber periphery and the statistical average value of the ratio of maximum thickness to minimum thickness is from 2 to 6.

* * * * *